United States Patent [19]

Hashimoto

[11] 4,206,476
[45] Jun. 3, 1980

[54] CONTROL CIRCUIT FOR USE WITH A TIME-COMPRESSION/TIME-EXPANSION SYSTEM IN A PULSE SIGNAL RECORD/PLAYBACK DEVICE

[75] Inventor: Yoshitaka Hashimoto, Chofu, Japan

[73] Assignee: Sony Corporation, Tokyo, Japan

[21] Appl. No.: 962,675

[22] Filed: Nov. 21, 1978

Related U.S. Application Data

[63] Continuation of Ser. No. 770,893, Feb. 22, 1977, abandoned.

[30] Foreign Application Priority Data

Feb. 24, 1976 [JP] Japan .................................. 51-19197

[51] Int. Cl.$^2$ ............................................. H04N 5/76
[52] U.S. Cl. ........................... 358/127; 360/8;
179/15.55 T; 365/230; 360/32; 360/36
[58] Field of Search .................... 360/8, 9, 19, 32, 36,
360/37; 179/15.55 T; 358/127, 144, 138;
365/230, 239, 233

[56] References Cited

U.S. PATENT DOCUMENTS

| | | | |
|---|---|---|---|
| 3,651,276 | 3/1972 | Clark | 360/70 |
| 3,789,137 | 1/1974 | Newell | 360/8 |
| 3,860,952 | 1/1975 | Tallent | 360/36 |
| 3,900,887 | 8/1975 | Soga | 360/19 |
| 3,962,689 | 6/1976 | Brunson | 365/239 |
| 4,030,129 | 6/1977 | Whitlock | 360/32 |

FOREIGN PATENT DOCUMENTS 1407196 9/1975 United Kingdom ................. 360/8

OTHER PUBLICATIONS

"Pulse Code Modulation Recording System", by Iwamura et al, J. Audio Eng. Society, Sep. 1973, vol. 21, No. 7, pp. 535-541.
"PCM Recorder-A New Type of Audio Magnetic Tape Recorder", by Sato, J. Audio Eng. Society, Sep., 1973, vol. 21, No. 7, pp. 542-548.

*Primary Examiner*—Bernard Konick
*Assistant Examiner*—Alan Faber
*Attorney, Agent, or Firm*—Lewis H. Eslinger; Alvin Sinderbrand

[57] ABSTRACT

A system for using a video signal recorder/playback device of the type normally adapted to record and/or reproduce video signals on a record medium, for recording and/or reproducing pulse signals on the record medium. The system includes time-compression/time-expansion apparatus for compressing the time domain of the pulse signals which are to be recorded and for expanding the time domain of the pulse signals which are reproduced. The time-compression/time-expansion apparatus includes a memory having addressable storage locations for temporarily storing pulse signals therein; write-in circuitry for writing pulse signals into the addressable storage locations at a first rate; read-out circuitry for reading out the stored pulse signals at a second rate, the write-in and read-out circuitry operating substantially independently of each other and at the same time; and an address generator for generating selected write-in and read-out addresses corresponding to the storage locations into which the pulse signals are written and from which the pulse signals are read. The apparatus also includes a detector for selectively detecting when all of the storage locations are filled or are empty, in which the detector includes an address comparator for comparing each bit in the write-in address code to each corresponding bit in the read-out address code to detect when all of the compared bits represent the same storage location. For time-compression, the read-out rate is faster than the write-in rate. For time-expansion, the read-out rate is slower than the write-in rate. The apparatus further includes a pulse generator coupled to the address comparator for generating a reset pulse when the address codes generated by the write-in and read-out address generators are equal.

9 Claims, 12 Drawing Figures

CONTROL CIRCUIT FOR USE WITH A TIME-COMPRESSION/TIME-EXPANSION SYSTEM IN A PULSE SIGNAL RECORD/PLAYBACK DEVICE

This is a continuation of application Ser. No. 770,893, filed Feb. 22, 1977, now abandoned.

BACKGROUND OF THE INVENTION

This invention relates to the recording and/or reproduction of pulse encoded information and, more particularly, to control apparatus for use in a recording/reproducing system which utilizes a video signal recorder/reproducer.

A magnetic video recorder, such as a video tape recorder (VTR) exhibits a sufficiently wide recording bandwidth such that it can be used to record audio signals with extremely high fidelity. A conventional type of VTR, when used to record an NTSC color video signal, records such a signal in parallel slant tracks, each track having a video field recorded therein. In view of the relatively low frequencies of an audio signal, there is a far greater signal storage capacity in each slant track than is needed for the audio signal. Accordingly, it is not advantageous to record an analog audio signal in place of a video signal in the slant tracks of a VTR.

If an audio signal is encoded into a digital signal, such as a PCM data signal, the resultant pulse signals can be processed without a concomittent loss in signal information. That is, the pulse signals can be transmitted or recorded with great accuracy. However, in order to exhibit the necessary high bandwidth for magnetically recording such pulse signals, suitable magnetic recording equipment heretofore has been very expensive. A VTR of the type now available for home video recording use is far less expensive than professional-type high bandwidth magnetic recording equipment, yet such a VTR offers a satisfactory bandwidth characteristic to permit the magnetic recording of a pulse encoded audio signal.

In order to use a VTR advantageously for recording pulse encoded data in general, or pulse encoded audio information in particular, it is necessary to record control signals which represent, or are similar to, the normal horizontal and vertical synchronizing signals which are included in video signals. This is because the control mechanism of the VTR relies upon these synchronizing signals for the purpose of controlling the movement (e.g., rotation) of the recording/playback head or heads as well as the movement of the recording tape in close synchronism. Accordingly, simultated horizontal and vertical synchronizing signals should be generated and combined with the pulse data so as to supply the VTR with a continuous composite signal for recording which, in some important aspects, is analogous to the video signals normally recorded by such VTR. Furthermore, these simulated synchronizing signals should not interfere with the pulse data. That is, to avoid loss of useful pulse data information, such pulse data should not be replaced by the simulated synchronizing signals.

In accordance with one feature of the apparatus described below, the time domain of the pulse data is compressed for recording, thus leaving "gaps" in the pulse signal into which the desired simulated synchronizing signals can be inserted. During playback, the synchronizing signals are removed and the "gaps" are eliminated by expanding the time domain of the pulse data. This time-compression and time-expansion are achieved by using a memory device having addressable storage locations into which the pulse data is written at one rate and out of which the stored pulse data is read at a second rate. Time-compression is achieved if the second rate exceeds the first rate; and time-expansion is achieved if the converse is true.

As will be described, the memory device advantageously can be constructed to have limited storage capacity. The write-in and read-out operations, although performed at different rates, are carried out substantially independently of each other and at the same time. When pulse data is read out of the memory at a faster rate than that in which the pulse data is written in, there is the possibility that previously read data will be re-read because the faster read-out operation will have overtaken the write-in operation. If the read-out operation is permitted to continue under these circumstances, erroneous data will be read out.

During a reproducing operation the reproduced pulse data is written into the memory at a faster rate than that in which the pulse data is read out. In that event, there is the possibility that all of the storage locations in the memory will be filled because the write-in operation will have overtaken the read-out operation. Under these circumstances, the writing in of additional data will distort the data which has yet to be read out.

OBJECTS OF THE INVENTION

Therefore, it is an object of the present invention to provide control circuitry for use in a recording/reproduce system of the type described above.

Another object of this invention is to provide control circuitry for use in a time-compression/time-expansion system of the type utilizing an addressable memory into which pulse encoded data is written and out of which pulse encoded data is read, whereby predetermined conditions of the memory are detected.

A further object of this invention is to provide a memory control circuit for use with an addressable memory device having different data write-in and read-out rates for detecting when the memory is filled with data and for detecting when all of the data which had been stored in the memory has been read out therefrom.

Various other objects, advantages and features of the present invention will become readily apparent from the ensuing detailed description, and the novel features will be particularly pointed out in the appended claims.

SUMMARY OF THE INVENTION

In accordance with this invention, a system is provided for use with video signal recording/reproducing apparatus of the type normally adapted to record and/or reproduce signals on a record medium, whereby such apparatus is used to record and/or reproduce pulse signals onto and from the record medium. The system includes time-compression/time-expansion circuitry for compressing the time domain of pulse signals which are to be recorded and for expanding the time domain of reproduced pulse signals. The time-compression/time-expansion circuitry includes a memory having addressable storage locations for temporarily storing the pulse signals therein; a write-in circuit for writing the pulse signals into the memory at a first rate; a read-out circuit for reading out the stored pulse signals from the memory at a second rate different from the first rate, the write-in and read-out circuits operating substantially independently of each other and at the same time; and an address generator for generating selected write-in and read-out addresses corresponding to the memory storage locations into which the pulse signals are written and from which the pulse signals are read. The system also includes a detector for selectively detecting when all of the memory storage locations are filled and for detecting when all of the data which has been written into the memory has been read out therefrom. The detector includes an address comparator for comparing each bit in the write-in address code to each corresponding bit in the read-out address code to detect when all of the compared bits represent the same storage location. The system further includes a reset means, such as a pulse generator, coupled to the detector, for generating a reset signal when the same storage location is represented by both the write-in address code and the read-out address code.

BRIEF DESCRIPTION OF THE DRAWINGS

The following detailed description, given by way of example, will best be understood in conjunction with the accompanying drawings wherein.

DETAILED DESCRIPTION OF A PREFERRED EMBODIMENT

Overall System

Figure 1:
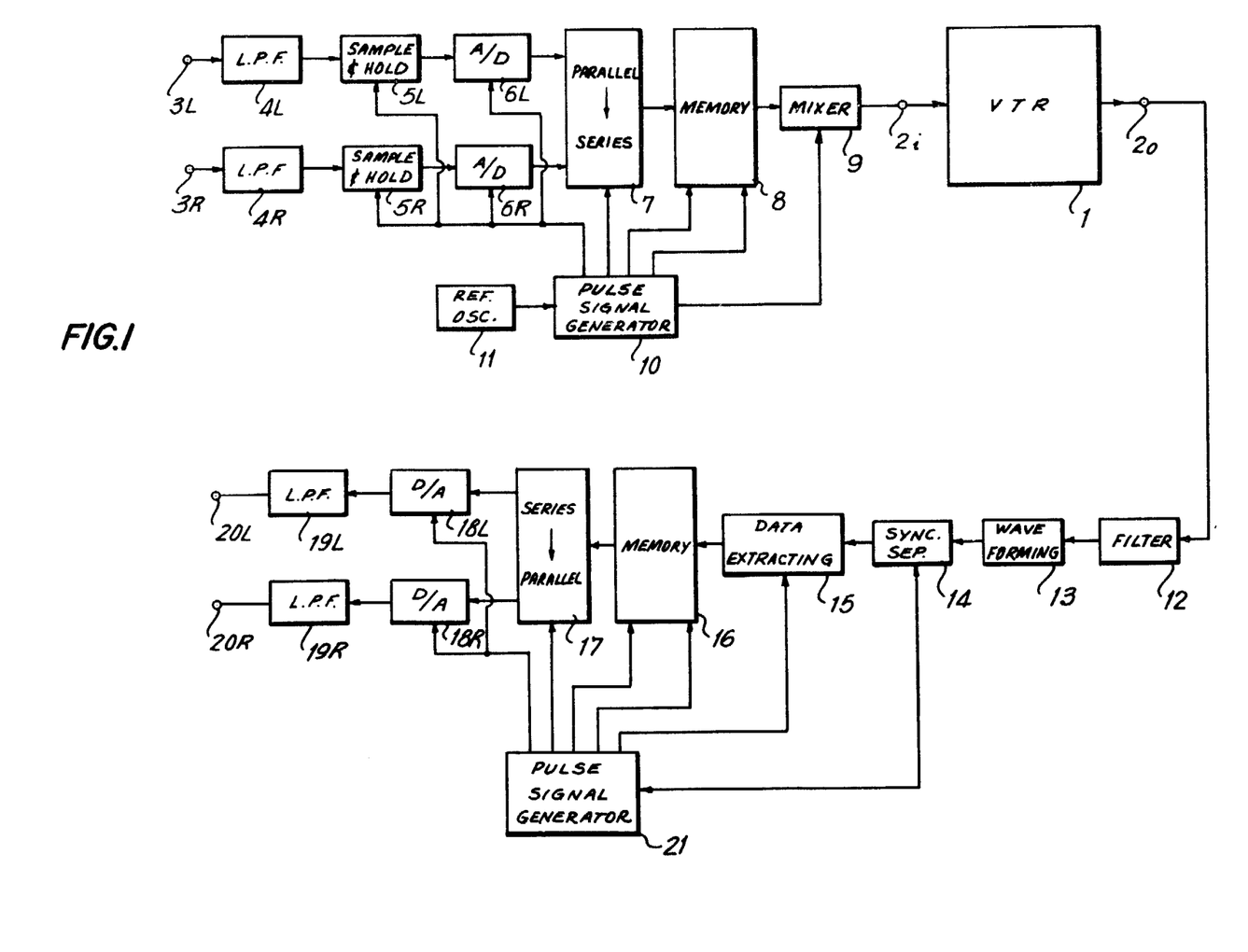
FIG. 1 is an overall system block diagram wherein the present invention finds ready application.

Referring now to the drawings, and in particular to FIG. 1, there is illustrated a block diagram of one embodiment of apparatus which can be used in conjunction with a video signal recorder to record signals, and particularly pulse signals, onto a record medium and to reproduce such signals from the record medium. For the purpose of the present description, the video signal recorder is assumed to be a video tape recorder (VTR) 1 and the record medium is assumed to be magnetic tape. However, it will be apparent that other types of recorders and recording media can be used, such as an optical recorder, a magnetic sheet, disc, or the like. As is known, VTR 1 is adapted for normal operation to record and play back video signals. For this purpose, VRT 1 includes circuitry that utilizes the synchronizing signals normally accompanying a video signal to particularly control a recording and a playback operation. As one example, VTR 1 is of the type having two rotary heads spaced 180° apart that scan successive slant tracks across magnetic tape, each such track having one field of an NTSC signal recorded therein. Such a VTR has a bandwidth that is sufficiently wide so as to be capable of recording pulse signals in the slant tracks. Since, in the conventional VTR, each rotary head records and reproduces a serial signal, these heads can be used to record and reproduce pulse signals in serial form. While these pulse signals can, of course, represent a wide variety of data, or information, the system shown in FIG. 1 will be described for the application wherein analog audio signals are represented by pulse signals. This can be achieved by sampling audio signals, for example, left and right stereo signals, and suitably encoding each sample, as by pulse code modulation (PCM) encoding.

In order to understand better the following description and appreciate the improvements achieved by the system of FIG. 1, an explanation of preferred parameters now is given. Practically, VTR 1 is capable of recording 1,400,000 bits per second (1.4 M bit/sec.), thus having a pulse signal recording rate corresponding to 1.4 MHz. If the audio signal is to be enabled to undergo a dynamic range of 90 dB for high fidelity recording, a sampled signal should be encoded with 13 bits. Hence, if left and right stereo signals are contemplated, then each digital word is comprised of 26 bits (13 bits per channel). Now, in a conventional VTR, it is convenient for the frequency of the signal that is recorded to be related to the horizontal synchronizing signal frequency $f_h$ so that the digital word recording signal frequency $f_t = nf_h$, where n is an integer; but $f_t < (1.4 \times 10^6)/26$ or ft should be less than 53.85 KHz. Also, each slant track has one field of a video signal recorded therein, and each field is comprised of 262.5 horizontal line intervals. However, useful information, that is, pulse encoded audio information, is not recorded during the vertical synchronizing interval which, generally, is comprised of about twenty horizontal line intervals (20H).

If it assumed that the maximum frequency in the audio signal to be recorded is approximately 20 KHz, then the minimum sampling frequency $f_s$ necessary to encode this audio signal is twice the maximum frequency, or 40 KHz. Therefore, the minimum digital word recording signal frequency should be greater than the ratio between the number of horizontal line intervals in a field and the number of useful horizontal line intervals in that field, times the minimum sampling frequency, that is, $f_t > 262.5/(262.5-20) \times 40 \times 10^3$ or $f_t > 43.3$ KHz. The following summary of the foregoing conditions $43.3 \text{ KHz} < (f_t = nf_h) < 53.85 \text{ KHz}$ is satisfied by:

$$f_t = 3f_h = 3 \times 15.75 \text{ KHz} = 47.25 \text{ KHz}.$$

Consistent with this expression, the sampling frequency $f_s$ may be expressed as $f_s = (262.5-20)/262.5 \times f_t = 43.65$ KHz. However, the sampling frequency $f_s$ should be related to the recording signal frequency $f_t$ by an integral number. If $f_t/f_s = 15/14$, as an example, then $f_s = 44.1$ KHz. Thus, the number of samples N recorded in each field is equal to the sampling frequency $f_s$ divided by the duration of a field, $N = (44.1 \times 10^3)/60 = 735$. As mentioned above, each sample is formed of a 26-bit word with 13 bits representing the left-channel audio signal and 13 bits representing the right-channel audio signal of a stereo signal. Also, three words (or three left and right channel samples) are provided during each horizontal line interval. Hence, the number of horizontal line intervals during each field that are occupied by pulse encoded audio signals is equal to 735/3, or 245 line intervals. Thus, the vertical blanking interval in each field should be $262.5-245=17.5H$, or 17.5 horizontal line intervals.

The apparatus of FIG. 1 operates with the foregoing parameters to record pulse encoded audio signals on a magnetic medium and to reproduce such signals therefrom. As shown, the system includes a recording channel comprised of a low-pass filter 4L, a sampling circuit 5L, an analog-to-digital (A/D) converter 6L and a parallel-to-serial converter 7 for the left channel and a low-pass filter 4R, a sampling circuit 5R, an analog-to-digital (A/D) converter 6R and parallel-to-serial converter 7 for the right channel. The system also includes a reproducing channel comprised of a serial-to-parallel converter 17, digital-to-analog (D/A) converter 18L and low-pass filter 19L for the left channel and serial-to-parallel converter 17, a digital-to-analog (D/A) converter 18R and a low-pass filter 19R for the right channel. As may be appreciated, the recording channel is adapted to supply the pulse encoded audio signals (hereinafter, pulse signals) to VTR 1 for recording, while the reproducing channel is adapted to supply the pulse signals reproduced by VTR 1 to suitable sound reproduction devices (not shown). To accommodate the different sampling and recording frequencies $f_s$ and $f_t$, respectively, and furthermore, to permit the pulse signals to be combined with simulated horizontal and vertical synchronizing pulses (to be described) without loss of pulse data, a memory device 8 is provided between the recording channel and the VTR, while a memory device 16 is provided between the VTR and the reproducing channel. In a practical embodiment, both memory devices are combined into a single addressable memory, such as a random access memory (RAM) that is used selectively during a recording or reproducing operation.

Low-pass filter 4L is coupled to an audio input terminal 3L to receive the left-channel audio signal and to supply this audio signal to sampling circuit 5L. As one example, the sampling circuit is a sample-and-hold circuit responsive to sampling signals of frequency $f_s$ produced by pulse generator 10 to produce periodic amplitude samples of the audio signal. These samples are applied to A/D converter 6L which produces a pulse encoded representation, for example, a parallel 13-bit signal, of the analog sample. These parallel bits are supplied to parallel-to-serial converter 7 for serialization. Similarly, the right-channel audio signal is received by an audio input terminal 3R, and low-pass filter 4R, sampling circuit 5R and A/D converter 6R function to supply a 13-bit pulse encoded representation of the right-channel audio signal sample to parallel-to-serial converter 7. Although not shown in detail, it is apparent that the parallel-to-serial converter is controlled by clock pulses applied thereto by pulse generator 10 for producing the 13 serialized bits of one channel, for example, the left channel, followed by the 13 serialized bits of the other channel.

The pulses produced by parallel-to-serial converter 7 are supplied to memory 8 to be written into addressed locations therein in response to write pulses derived from pulse generator 10. In a preferred embodiment described below, the memory is a RAM and each pulse is stored in a separately addressed location. Thus, the block designated "memory" also includes suitable control circuitry.

Since the sampling rate $f_s$ is less than the signal recording frequency $f_t$, memory 8 functions to vary the time domain of the pulse signals so as to adapt the pulse signals for recording. That is, these pulse signals are subjected to a time-compression operation. To this effect, the pulse signals previously stored in memory 8 are read out from their addressable locations in response to read pulses derived from pulse generator 10, and then supplied through a mixer circuit 9 to VTR 1. The purpose of the mixer circuit is to add the simulated video synchronizing signals to the pulse signals read out of memory 8, thereby enabling VTR 1 to be controlled in its operation in the usual manner, which is known to the television art and need not be explained herein.

Pulse generator 10 is a timing circuit to which reference clock pulses, such as produced by reference oscillator 11, are supplied, these reference clock pulses being used to generate the aforementioned sampling pulses, converter control pulses, memory write and read pulses, and video synchronizing pulses.

Figure 2A:
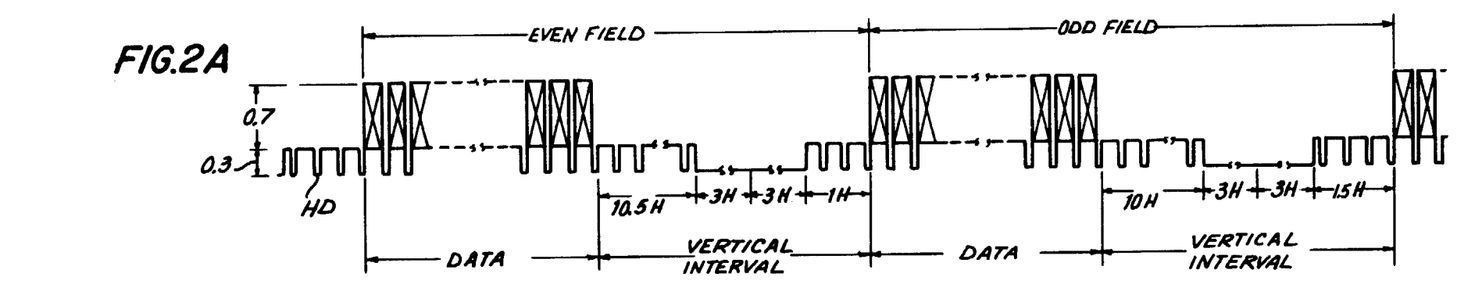
FIGS. 2A–2C are waveform diagrams representing how the system of FIG. 1 operates.

The format in which the pulse encoded audio signals are recorded by VTR 1 is shown in FIG. 2A. One complete frame is shown as being comprised of an even field followed by an odd field, the fields being separated by the vertical blanking interval, as is conventional for a video signal. This vertical blanking interval usually includes 10 or 10.5 horizontal line intervals which are provided with no video information, then a period of equalizing pulses occupying 3 horizontal line intervals, then a period of vertical synchronizing pulses occupying another 3 line intervals, followed by another period of equalizing pulses and 1.5 or 1 line intervals which are provided with no video information. Thus, a conventional video signal has a vertical blanking interval of 20 horizontal line intervals. The duration defined by the first 10 or 10.5 line intervals in the vertical blanking interval is used by VTR 1 for head switch-over; that is, switching from one rotary head to the other. Usually, the second set of equalizing pulses is used to define the video retrace interval. However, when VTR 1 is used to record audio information, this second set of equalizing pulses is not necessary. Hence, the vertical blanking interval can be shortened by three line intervals, thus extending the time during which useful information (i.e., audio information) can be recorded.

Therefore, as shown in FIG. 2A, the pulse encoded audio signals are recorded in an "even" field in a slant track by VTR 1, followed by a vertical blanking interval formed of 10.5 line intervals followed by 3 line intervals of equalizing pulses and 3 line intervals of vertical synchronizing pulses and then 1 line interval. Succeeding this vertical blanking interval is the "odd" field of pulse encoded audio signals, followed by a vertical blanking interval formed of 10 line intervals, then 3 line intervals of equalizing pulses, 3 line intervals of vertical synchronizing pulses and then 1.5 line intervals. In both the "even" and "odd" fields, the pulse signals are recorded as 735 successive words, each word being formed of 26 bits to represent the left and right channel samples, and 3 words being provided during each horizontal line interval. While these words are recorded similarly in each field, the "even" field of pulse data follows the vertical synchronizing pulses by 1.5 line intervals, while the "odd" field of pulse data follows the vertical synchronizing pulses by 1 line interval.

Figure 2B:
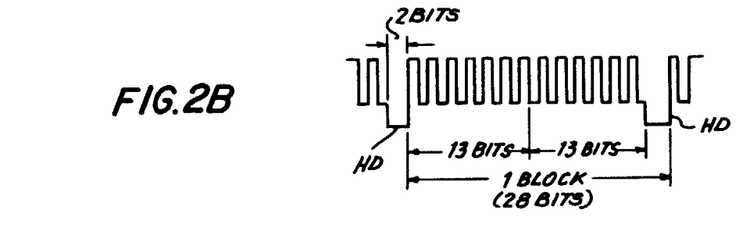

As shown in greater detail in FIG. 2B, successive words are separated by simulated synchronizing pulses $H_D$. These synchronizing pulses resemble horizontal synchronizing pulses, but are of three times the horizontal synchronizing frequency $f_h$. Synchronizing pulses $H_D$ are of a duration equal to two data bits and are of a period that is one-third the line interval. The synchronizing pulses are produced by pulse generator 10 as aforesaid, and are less than the pulse amplitude of the pulse encoded audio information. In one example the ratio of synchronizing pulse level $H_D$ to data pulse level is 3:7, with the synchronizing pulses being negative. These synchronizing pulses can be inserted into "gaps" between successive words, which gaps can be provided by parallel-to-serial converter 7, or by the read-out operation of memory 8, as will be described below, and which coincide with the synchronizing pulses produced by pulse generator 10. For the purpose of simplification, the pulse data shown in FIG. 2B is assumed to be formed of alternating 1's and 0's.

Figure 2C:
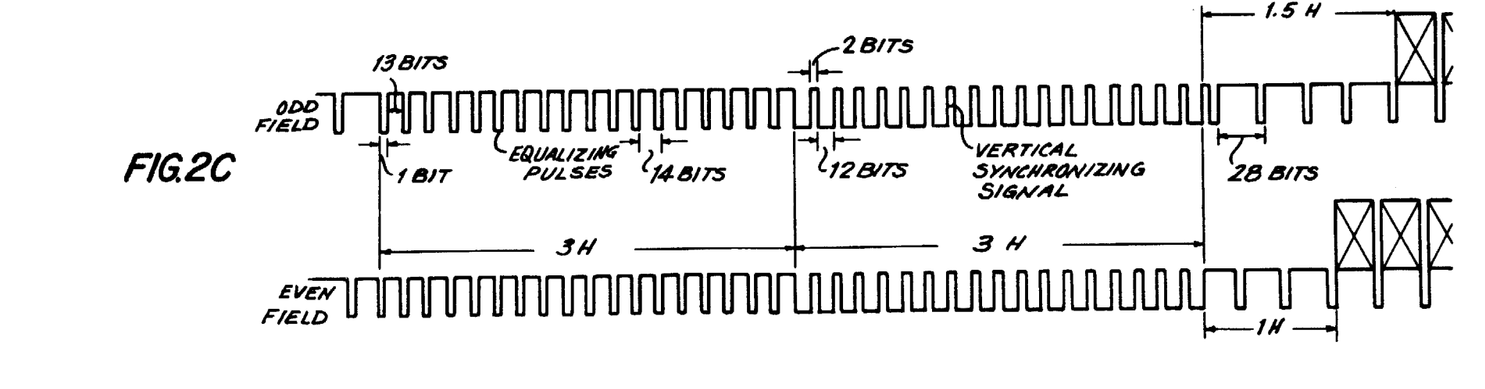

In a conventional video signal, the equalizing pulses are negative and are twice the frequency of the horizontal synchronizing pulses. The vertical synchronizing pulses also are twice the frequency of the horizontal synchronizing pulses, but are positive. Consistent with this video signal format, the equalizing pulses here recorded on VTR 1 are negative and are twice the frequency of the synchronizing pulses $H_D$; while the vertical synchronizing pulses are positive and are twice the frequency of synchronizing pulses $H_D$, as shown in FIG. 2C. The width of each equalizing pulse is equal to 1-bit width, and the width of each vertical synchronizing pulse is equal to 2-bit widths.

The signal format of the pulse encoded audio signals, as shown in FIGS. 2A-2C, is very similar to that of a conventional video signal and, therefore, readily can be recorded by VTR 1. That is, the VTR includes servo control apparatus which is responsive to the vertical synchronizing signal for controlling the rotation of the magnetic heads and the movement of tape and time-base error correcting circuitry which is responsive to the horizontal synchronizing signal to correct for time-base error during signal playback. This apparatus and circuitry likewise respond to the vertical synchronizing signals and synchronizing pulses $H_D$ which are provided with the pulse encoded audio signals, as shown in FIGS. 2A-2C.

In view of the foregoing, if the pulse signals were recorded at the same rate at which they are produced, the fact that the audio signal is continuous means that there would not be any available interval to insert the aforementioned vertical synchronizing signal. Rather, a portion of the audio information would have to be replaced by the vertical synchronizing signal, thus degrading the quality of the audio information which is reproduced. However, since time compression of the pulse signals is achieved by the operation of memory 8, a suitable interval is provided within which the vertical synchronizing signal can be inserted without impairing the audio information.

Returning to FIG. 1, after the aforedescribed pulse-encoded audio signal is recorded by VTR 1, it may be reproduced subsequently. For this purpose, the reproducing channel is shown connected to an output terminal $2_0$ of the VTR. This reproducing channel may be in combination with the illustrated recording channel, or it may form separate apparatus. In addition to memory 16, serial-to-parallel converter 17, D/A converters 18 and low-pass filters 19, described above, the reproducing channel also includes a filter 12 coupled to VTR output $2_0$ for removing noise components in the reproduced pulse signals, a wave shaping circuit 13 coupled to filter 12 for reshaping the pulse signals, a synchronizing signal separator circuit 14 coupled to wave shaping circuit 13 for separating the synchronizing signals from the reproduced pulse signals, and a data extracting circuit 15 coupled to separator circuit 14 for passing, or transmitting, the data pulses to memory 16. A pulse generator 21 is coupled to separator circuit 14 for sensing the synchronizing signals and for generating various timing signals in response thereto. As illustrated, these timing pulses are applied to data extracting circuit 15, memory 16, serial-to-parallel converter 17 and D/A converters 18.

In operation, VTR 1 reproduces the pulse signals recorded in the slant tracks, as shown in FIGS. 2A-2C, at the same rate as the signal recording rate. Synchronizing signal separator circuit 14 and data extracting circuit 15 remove synchronizing pulses $H_D$ and those pulses in the vertical blanking interval occupying the 17.5 horizontal line intervals, illustrated in FIGS. 2A and 2C. The resultant pulse data signal thus includes a gap between fields of useful pulse signals. Memory 16 writes these pulse signals into addressable locations therein at the pulse playback rate, and reads them out at the original sampling rate as determined by timing pulses applied by pulse generator 21. Hence, time expansion of the reproduced pulse signals is achieved, effectively "stretching" the duration of each data word to be the same as that produced originally by parallel-to-serial converter 7.

The time-expanded serialized pulse signals read out of memory 16 are converted to parallel form by serial-to-parallel converter 17, and the left channel (13-bit) encoded audio signal is converted to analog form by D/A converter 18L while the right channel (13-bit) encoded audio signal is converted to analog form by D/A converter 18R. After filtering in low-pass filters 19L and 19R, the left channel audio signal is provided at output terminal 20L and the right channel audio signal is provided at output terminal 20R.

Memory 16 is controlled by timing pulses generated by pulse generator 21 which are derived from the reproduced synchronizing signals, including synchronizing pulses $H_D$. Accordingly, if there is any time-base error in the reproduced signals, such as jitter, this time-base error is accounted for when the pulse signals are written into the memory. Such time-base error therefore is substantially removed.

Hence, a conventional video signal recorder, such as VTR 1, can be used to record and reproduce audio signals with high fidelity, without requiring any structural change or modification in the recorder itself.

Record/Playback Control

Figure 3:
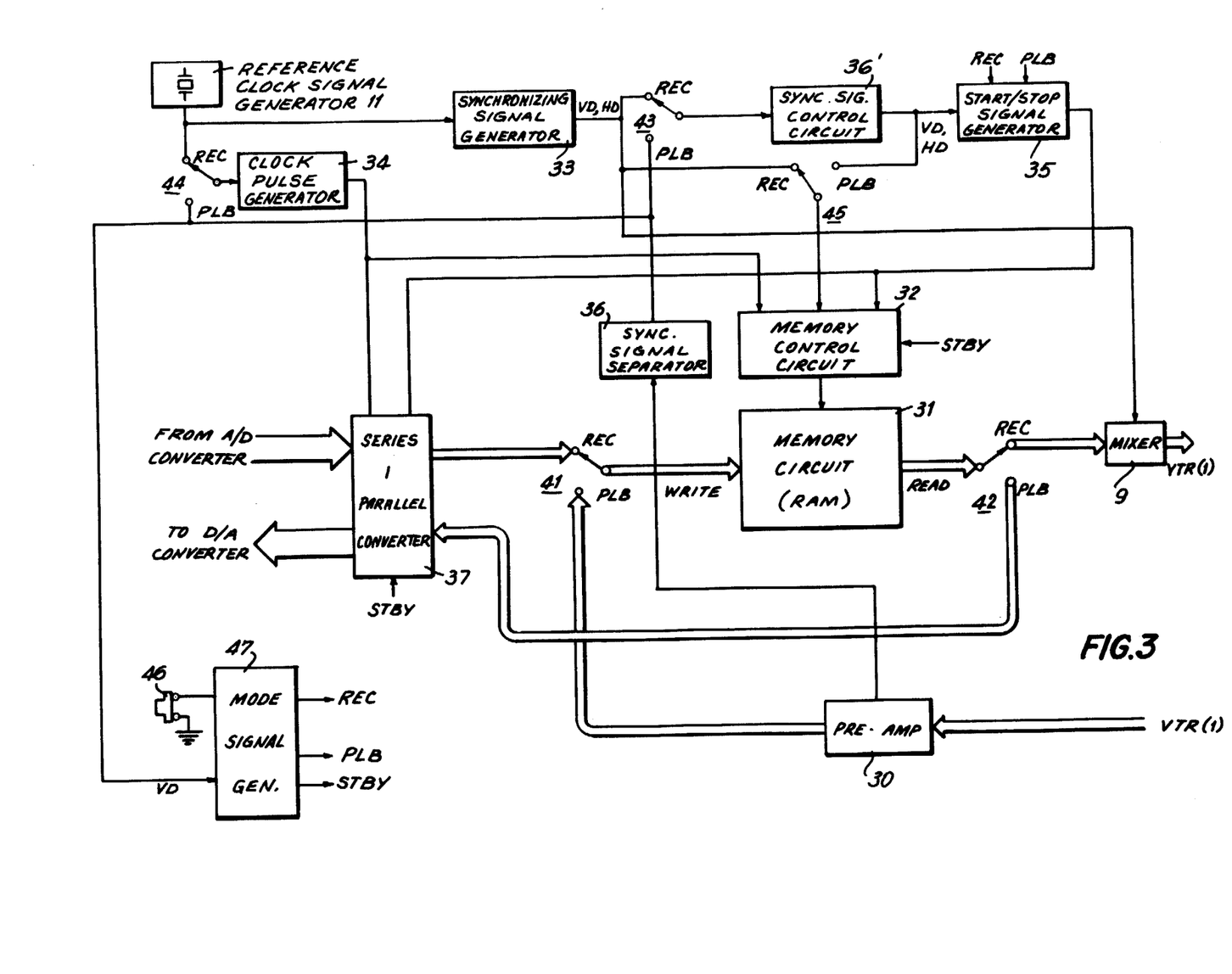
FIG. 3 is a block diagram showing a portion of the system of FIG. 1 in greater detail.

Referring now to FIG. 3, a portion of the overall system shown in FIG. 1 is illustrated in greater detail. The illustrated circuitry is used to control memory device 8 (16) for pulse recording and reproducing operations by VTR 1, the memory device here being identified by reference numeral 31 from which pulse data is supplied to VTR 1 through mixer 9 and to which pulse data is supplied by the VTR through a preamplifier 30. Also illustrated is a parallel-serial/serial-parallel converter 37 which is a practical embodiment of parallel-to-serial converter 7 capable of serializing pulse data during a recording operation, and also of serial-to-parallel converter 17 for converting a serial pulse train into parallel form during a reproducing operation. Thus, pulse encoded audio information produced by A/D converters 6R and 6L is serialized by converter 37 and then supplied to memory 31 wherein its time axis is compressed before being supplied through mixer 9 to VTR 1 for recording. As one example, the 26-bit parallel data word (FIG. 2B) supplied to converter 37 by A/D converter 6R and 6L may be serialized into 28 bits, thus adding the aforenoted 2-bit "gap" into which the synchronized pulses $H_D$ can be inserted in mixer 9. During signal playback, the pulse data reproduced by VTR 1 is supplied through preamplifier 30 to memory 31, wherein the time axis thereof is expanded, and then reconverted to parallel form by converter 37 before being transformed into an analog audio signal by D/A converters 18L and 18R. This data signal path is represented by the double lines shown in FIG. 3.

Control over memory 31 and the data signal path is achieved by appropriate control signals transmitted along control signal paths represented by the single line in FIG. 3. Although single lines are shown, in some instances, a single line represents plural conductors. The control circuitry is formed of reference oscillator 11, synchronizing signal generator 33, clock pulse generator 34, START/STOP signal generator 35, synchronizing signal separator 36, sync signal control circuit 36', mode signal generator 47 and memory control circuit 32. Also shown are various record/playback selector switches 41 through 45, adapted for simultaneous automatic operation between a record (REC) condition and a playback (PLB) condition, and a record selecting pushbutton switch 46. Reference oscillator 11 is adapted to produce reference clock pulses of a relatively high frequency, these clock pulses being supplied to synchronizing signal generator 33 and through switch 44 in its REC condition to clock pulse generator 34. The synchronizing signal generator functions to generate synchronizing pulses $H_D$ (FIGS. 2A–2C) and also the various pulses shown during the vertical blanking interval (FIGS. 2A and 2C), hereinafter designated the vertical sync signal $V_D$, which is a simulated vertical synchronizing signal. Synchronizing signal generator may be comprised of conventional counting and gating circuits arranged in circuit to generate pulses $H_D$ and vertical sync signal $V_D$.

Clock pulse generator 34 is formed of frequency-dividing, timing and gating circuitry and is adapted to produce various timing signals which are supplied to converter 37 and to memory control circuit 32. When switch 44 is in its REC condition, clock pulse generator 34 responds to the reference clock pulses generated by reference oscillator 11 to produce the timing signals by which converter 37 converts parallel pulses to serial pulses and to produce memory timing pulses which are used by memory control circuit 32 to control the writing-in and reading-out of data with respect to memory 31. When switch 44 is in its PLB condition, clock pulse generator 34 is responsive to synchronizing signals $H_D$, which are reproduced by VTR 1 from previously recorded magnetic tape, for producing the timing pulses. Hence, during a reproducing operation, memory 31 and converter 37 are synchronized with any time-base error that may be present, thereby to correct for jitter or other signal distortion caused by, for example, tape fluctuation, tape shrinkage, stretching, etc.

Vertical sync signal $V_D$ and synchronizing signal $H_D$ produced by synchronizing signal generator 33 are supplied to sync signal control circuit 36' by switch 43 when the latter is in its REC condition. These signals also are supplied to mixer 9 for combining with the pulse data read out of memory 31 so as to form the composite signal shown in FIG. 2A for recording. Sync signal control circuit 36' is adapted to selectively delay the vertical sync signal $V_D$ so as to selectively extend the duration of the vertical blanking interval during each odd field. That is, the sync signal control circuit selectively determines whether data pulses will follow the vertical synchronizing pulses by one synchronizing pulse period ($H_D$) or by 2.5 synchronizing pulse periods for a purpose described in greater detail below. Sync signal control circuit 36' may comprise a selectively energized, or gated, delay circuit, such as a monostable multivibrator. The delayed, or extended, vertical sync signal together with synchronizing pulses $H_D$ generated by synchronizing signal generator 33 are supplied to START/STOP signal generator 33 when switch 43 is in its REC condition.

The START/STOP signal generator is adapted to produce gating signals, for example, START signals, at appropriate times and of suitable duration in response to synchronizing pulses $H_D$ and vertical sync signal $V_D$ such that pulse data can be written into and read out of memory 31. During a recording operation, the START signal produced by START/STOP signal generator 35 for reading pulse data out of memory 31 is of a duration corresponding to the time needed to transmit 735 words to VTR 1 between vertical blanking intervals; and, similarly, during a reproducing operation, the START signal for writing pulse data into memory 31 from VTR 1 also corresponds to this duration. The START signal produced by the START/STOP signal generator for writing pulse data into memory 31 during recording and for reading pulse data out of this memory during reproducing is substantially continuous, except that the recording write pulse START signal commences at the start of the next field interval following initiation of the recording operation, and the reproducing read pulse START signal is delayed by an amount sufficient to permit some number of words to be written into the memory following initiation of the reproducing operation. When a START signal is not produced by START/STOP signal generator 35, a STOP signal is produced to inhibit data from being written into and read out of memory 31. Accordingly, the START/STOP signal generator is comprised of pulse counting, gating and delay circuitry which is responsive to the synchronizing pulses $H_D$ and vertical sync signal $V_D$, as well as to record control signal REC and reproducing (or playback) control signal PLB which are supplied thereto by mode signal generator 47, to be described. The START and STOP signals are supplied to memory control circuit 32 and to converter 37 for selectively enabling or inhibiting the operation of these circuits.

Memory control circuit 32 is described in greater detail below with respect to FIG. 4. If it is assumed that memory 31 is addressable, such as a RAM, then the memory control circuit includes addressing circuits for generating write-in and read-out addresses for the memory so that pulse data can be written into and read out of memory 31, respectively, thereby changing the time-axis thereof (time-domain compression and expansion). The write-in and read-out operations are performed substantially independently of each other, but at different rates. To avoid the possibility of an erroneous write-in or read-out operation which could occur in the event that these operations are performed at the same instant of time, memory control circuit 32 includes priority determining circuitry to aware priority to one operation while delaying the performance of the other. The memory control circuit is shown coupled to memory 31 to supply the suitable addresses and read/write control pulses to the memory so that pulse data can be stored and withdrawn therefrom. As will be further described in connection with FIG. 4, memory 31 may include input and output circuitry through which the pulse data is written in and read out.

Synchronizing signal separator circuit 36 is coupled to preamplifier 30 and is adapted to detect the synchronizing pulses $H_D$ and vertical sync signal $V_D$ that are included in the pulse signals reproduced by VTR 1. The synchronizing signal separating circuit may be of a type conventionally used in video (e.g. television) signal applications, such as formed of gating and timing circuits. Synchronizing pulses $H_D$ are supplied by synchronizing signal separator circuit 36 to clock pulse generator 34 via switch 44 in its PLB condition so that the clock pulse generator can provide suitable timing pulses to converter 37 for a serial-to-parallel data conversion, and suitable timing pulses to memory control circuit 32 for storing pulses and withdrawing pulses from memory 31, during a reproducing operation. Also, when switch 43 is in its PLB condition, the synchronizing pulses $H_D$ and vertical sync signal $V_D$ recovered by synchronizing signal separator circuit 36 are supplied to START/STOP signal generator 35 in place of the synchronizing pulses and vertical sync signal that are produced by synchronizing signal generator 33, described above.

Vertical sync signal $V_D$ produced by synchronizing signal separator circuit 36 also is applied to mode signal generator 47. The mode signal generator is responsive to the operation of record selecting pushbutton switch 46 to generate a record enable control signal REC or a playback enable control signal PLB, as aforesaid, and also to generate a standby signal STBY immediately following the actuation of switch 46 but prior to the occurrence of the REC and PLB signals, respectively. The PLB and STBY signals are synchronized with vertical sync signals $V_D$ produced by synchronizing signal separator circuit 36 so that memory control circuit 32, START/STOP signal generator 35 and converter 37, which are supplied with selected ones of the PLB and STBY signals, are correspondingly synchronized with the signals reproduced by VTR 1. Standby signal STBY serves to reset memory control circuit 32 and converter 37 to an initial, or reference, condition so as to avoid an improper write-in or read-out operation of memory 31. Playback control signal PLB is produced when switch 46 is open and record control signal REC is produced when this switch is closed. Of course, if desired, the manner in which PLB and REC signals are produced can be reversed.

The operation of the illustrated apparatus can be readily ascertained from the foregoing description; hence, such operation now will be described only briefly. Let it be assumed that a recording operation is selected so that switches 41 through 45 are in their respective REC conditions, and record selecting pushbutton switch 46 is closed. Hence, the reference clock pulses produced by reference oscillator 11 are utilized by clock pulse generator 34 to produce the timing pulses which control memory control circuit 32 and converter 37. The reference clock pulses also are utilized by synchronizing signal generator 33 to generate synchronizing pulses $H_D$ and the vertical sync signal $V_D$.

When switch 46 is closed, standby signal STBY first is produced by mode signal generator 47 to reset converter 37 and memory control circuit 32 to their respective initial conditions. Then, mode signal generator 47 produces record control signal REC which actuates START/STOP signal generator 35 to respond to synchronizing pulses $H_D$ and vertical sync signal $V_D$ to produce the START signal which enables pulse data to be written into and read out of memory 31. Thus, a parallel-bit word supplied to converter 37 by the A/D converters (FIG. 1) is serialized, supplied through switch 41 and written into addressed locations in memory 31 at a first, slower rate. As mentioned previously, the serialized words can be spaced from each other by, for example, two bits, which is sufficient to permit the synchronizing pulse $H_D$ to be inserted therein, as shown in FIG. 2B. The stored pulses subsequently are read out of their storage locations at a second, faster rate; and transmitted through switch 42 and mixer 9 to VTR 1 for recording. Synchronizing pulses $H_D$ are supplied to mixer 9 by synchronizing signal generator 33 for insertion between successive words; and the vertical sync signal produced by the synchronizing signal generator is inserted between adjacent fields. Depending upon the time of occurrence of the read START signal produced by START/STOP signal generator 35, which is a function of the delay imparted to the vertical sync signal $V_D$ by sync signal control circuit 36', pulse data will be read out of memory 31 either 1.0 or 1.5 line intervals following the vertical synchronizing pulses in the odd or even fields, respectively. Thus, pulse encoded audio signals of the type shown in FIGS. 2A–2C are recorded.

When a reproducing operation is selected, switches 41 through 45 are in their respective PLB conditions and record selecting pushbutton switch 46 is opened. Hence, the reference clock pulses produced by reference oscillator 11 no longer are supplied to clock pulse generator 34, nor are the synchronizing pulses $H_D$ and vertical sync signal $V_D$ produced by synchronizing signal generator supplied to START/STOP signal generator 35. The opening of switch 46 actuates mode signal generator 47 to produce the standby signal STBY in synchronism with the vertical sync signal $V_D$ which had been recorded and which is separated from the reproduced signal by synchronizing signal separator circuit 36. Thus, memory control circuit 32 and converter 37 are reset to their initial condition by this STBY signal. When the playback control signal PLB is produced by the mode signal generator, START/STOP signal generator 35 responds to the synchronizing pulses $H_D$ and vertical sync signal $V_D$ separated from the signals reproduced by VTR 1 and supplied thereto from synchronizing signal separator 36 via switch 43 to produce the START signal which enables pulse data to be written into and read out of memory 31. Also, the separated synchronizing pulses $H_D$ are supplied through switch 44 to clock pulse generator 34, whereby the clock pulse generator produces the timing pulses which control converter 37 and memory control circuit 32. Since these timing pulses are synchronized with the synchronizing pulses $H_D$ reproduced by VTR 1, the memory write-in operation performed by the memory control circuit will substantially correct for time-base errors in the reproduced signals.

Accordingly, serialized pulse data reproduced by VTR 1 is supplied to memory 31 via preamplifier 30 and switch 41 and is written into addressed location therein at the faster rate previously used to read-out and record the pulse data. The pulses now stored in memory 31 are read-out from their storage locations and serially transmitted through switch 42 to converter 37 at the slower rate previously used to write-in pulse data for recording. Since memory control circuit 32 is synchronized with recovered synchronizing pulses $H_D$ and is controlled by the START signal (which is synchronized with recovered vertical sync signal $V_D$), only the pulse encoded audio information reproduced by VTR 1 is stored in memory 31. This serialized pulse data is converted to a parallel-bit word by converter 37 which, in turn, is transformed into an analog audio signal by D/A converters 18L and 18R.

Memory and Memory Control

Figure 4A:
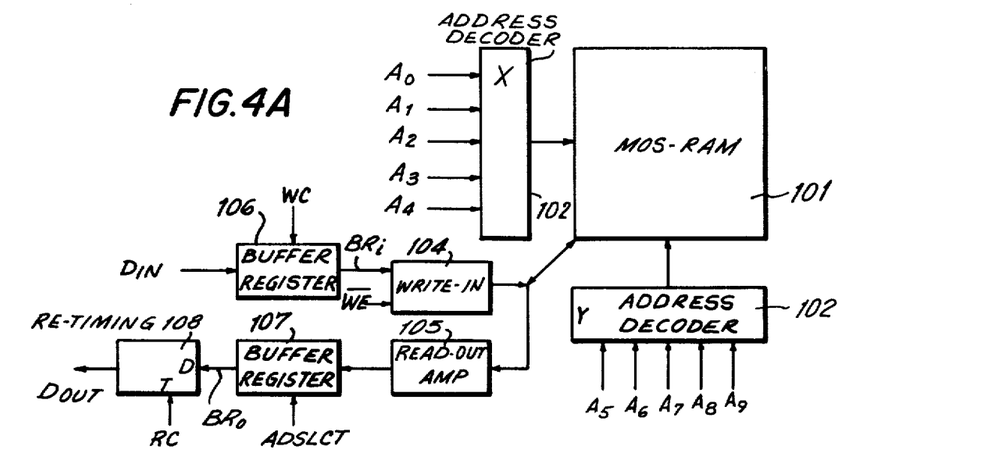
FIGS. 4A and 4B are block diagrams of the memory and memory control apparatus shown in FIG. 3.
Figure 4B:
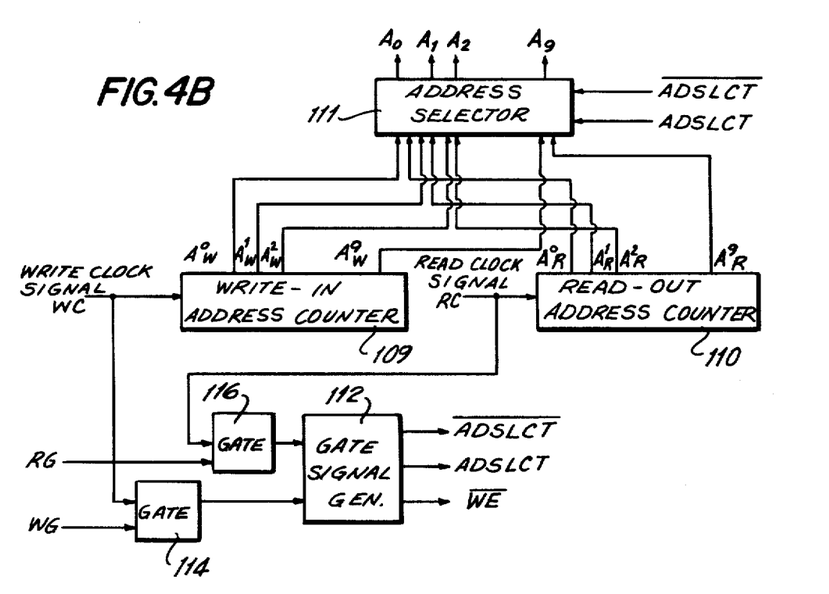

FIGS. 4A and 4B are block diagrams showing memory 31 and memory control circuit 32 (FIG. 3) in greater detail. With reference to FIG. 4A, the memory is illustrated as RAM 101, preferably formed of MOS devices, and having addressable X and Y coordinate locations. That is, a memory location whereat a data bit included in a pulse coded data word is stored is determined by an X coordinate and a Y coordinate. The number of addressable memory locations provided in RAM 101 is equal to its capacity $C_M$ which is equal to the capacity $C_A$ for compressing the time axis of the pulse data during a recording operation (or expanding the time axis during a reproducing operation) plus the capacity $C_B$ for correcting the time-base error that may be present in the reproduced data pulses. That is, $C_M = C_A + C_B$. For time compression, a number of data words first are stored in RAM 101 and then, as other data words are written in, the previously stored words are read out at a faster rate. The delay in reading out these words is equal to $C_A/f_s$, where $f_s$ is the sampling rate, and is determined such that the memory read-out operation for one field of pulse data terminates simultaneously with the write-in operation. Thus, in the waveforms of FIGS. 2A–2C, just after data word #735 is written into RAM 101, it is read out therefrom. The time required to read-out all of the 735 words from RAM 101 is $735/f_t$, while the time required to write all of these words into the RAM is $735/f_s$. Thus, $(C_A/f_s + (735/f_t)) = 735/f_s$. From the numerical parameters and relationships described previously, $C_A = 49$ words = 1274 bits.

In a reproducing operation, pulses are written into RAM 101 at a faster rate than the rate at which they are read out. If there is no time-base error, pulse read-out is initiated simultaneously with pulse write-in. However, if there is a time-base error, this can be corrected by delaying the read-out operation by $C_B/2f_t$. The capacity for time-base correction is selected to be $C_B = 12$ words. This means that time-base error or jitter, of greater than 0.2 Hz will be corrected. Therefore, the total capacity $C_M$ of RAM 101 is $C_M = C_A + C_B = 61$ words = 1586 bits. Hence, RAM 101 is provided with at least 1586 storage locations. A conventional random access memory that can be used for RAM 101 is a 64×64 X-Y addressable array.

RAM 101 is provided with X address leads coupled to an X-address decoder 102 and with Y address leads coupled to a Y-address decoder 103. These decoders are conventional and are adapted to select the proper X and Y addresses of RAM 101 in response to a digital address supplied to each. Although the decoders each are shown to receive a 5-bit address, it is appreciated that 64 addressable X locations are selected by a 6-bit address code, and 64 addressable Y locations also are selected by a 6-bit code. However, for simplification, it is assumed that X-address decoder 102 is provided with address bits $A_0 \ldots A_4$ and that Y-address decoder 103 is provided with address bits $A_5 \ldots A_9$. These address bits are generated by the addressing circuitry shown in FIG. 4B and are used to select write-in and read-out addresses, as will be described.

RAM 101 also is provided with a pulse input terminal coupled to a data write-in channel including a buffer register 106 and write-in gates 104. In addition, RAM 101 includes a pulse output terminal coupled to a read-out channel formed of a read-out amplifier 105, a buffer register 107 and a reclocking, or resynchronizing, circuit 108. For simplification, the pulse input and output terminals of RAM 101 are shown to be a single terminal; however, this need not be the actual construction thereof. Buffer register 106 of the write-in channel is, for example, a two or three bit shift register having an input terminal adapted to receive pulse data $D_{IN}$ supplied by parallel-to-serial converter 37 (FIG. 3) during a recording operation or by preamplifier 30 during a reproducing operation. Buffer register 106 also receives a write clock pulse WC produced by clock pulse generator 34, this pulse being derived during recording from the reference clock pulse produced by reference oscillator 11 and during reproducing from the recovered synchronizing pulses $H_D$. The buffer register thus re-times input pulse data $D_{IN}$ with write clock pulses WC to form resynchronized pulse data $BR_i$ which is supplied to write gates 104. A gating signal $\overline{WE}$ also is supplied to write gates 104 and is adapted to enable the write gate to write a data pulse into an addressed location of RAM 101. Gating signal $\overline{WE}$ is produced by a block shown in FIG. 4B and described in greater detail in copending application Ser. No. 766,746, filed Feb. 8, 1977, now U.S. Pat. No. 4,141,039. In this example, it will be assumed that a data pulse $BR_i$ is written into RAM 101 when gating signal $\overline{WE}$ is relatively negative, or of a low amplitude, corresponding to a binary 0.

In the read-out channel, pulse data supplied to read-out amplifier 105 from the RAM pulse output terminal is supplied to buffer register 107. A gating signal ADSLCT also is supplied to this buffer register and is adapted to enable it to transmit the data pulse that then is received from RAM 101. Hence, buffer register 107 may be formed of a gating circuit adapted to supply read out pulse data $BR_o$. The timing of these read out pulses $BR_o$ is dependent upon that of gating signal ADSLCT and, as will be mentioned in connection with FIG. 4B and described in greater detail in the aforementioned application, is asynchronous. In order to re-time, or resynchronize, pulses $BR_o$, they are supplied to reclocking circuit 108, which may be a timing-pulse controlled flip-flop circuit, such as a D-type flip-flop having a data terminal D supplied with pulse data $BR_o$ and a timing pulse terminal T supplied with read clock pulses RC. These read clock pulses are produced by clock pulses generator 34 and are described in greater detail in copending application Ser. No. 771,350, filed Feb. 23, 1977, now U.S. Pat. No. 4,138,694. Re-clocking circuit 108 supplies the resynchronized pulse data $D_{OUT}$ to VTR 1 during a recording operation and to serial-to-parallel converter 37 during a reproducing operation.

Although not shown in detail, RAM 101 is adapted to have data written into or read out of an addressed location so long as that address is present for a predetermined minimum time duration, this duration being a function of the particular memory device which is used. As will now be described with reference to FIG. 4B, a read-out address is present when gating signal ADSLCT is relatively positive, or high, corresponding to a binary 1, and a write-in address is present when complementary gating signal $\overline{\text{ADSLCT}}$ is a binary 1 (ADSLCT is a binary 0). These gating signals ADSLCT and $\overline{\text{ADSLCT}}$ as well as gating signal $\overline{\text{WE}}$, are produced by a gate signal generator 112, which is described in greater detail in Ser. No. 766,746, filed Feb. 8, 1977, in response to write clock pulse WC and read clock pulse RC applied via gate circuits 114 and 116, respectively. These gates are selectively enabled by a write gate pulse WG and a read gate pulse RG, respectively, thereby to enable a write-in or a read-out operation, as will be described with reference to FIG. 5 below.

In FIG. 4B, write clock pulses WC are applied to a write-in address counter 109 and read clock pulses RC are applied to a read-out address counter 110, respectively. These counters are similar and may be conventional binary or other digital counters capable of counting the clock pulses applied thereto so as to produce a binary or digital count representing the number of counted pulses. Hence, address counter 109 produces a coded count $A_{1W} \ldots A_{9W}$ representing a write-in address location for RAM 101, while address counter 110 produces a coded count $A_{1R} \ldots A_{9R}$ representing a read-out address location for RAM 101. These addresses are dependent upon the write and read clock pulses, and thus are independent of each other.

The write-in address count $A_{1W} \ldots A_{9W}$ and the read-out address count $A_{1R} \ldots A_{9R}$ are supplied to an address selector 111 which may comprise a gating circuit responsive to complementary gating signals ADSLCT and $\overline{\text{ADSLCT}}$ to provide one or the other address count at its output terminals. That is, when gating signal ADSLCT is a binary 1, address selector 111 gates the write-in address count $A_{1W} \ldots A_{9W}$ to its output terminals; whereas when gating signal $\overline{\text{ADSLCT}}$ is a binary 1 (ADSLCT is a binary 0), address selector 111 gates the read-out address count $A_{1R} \ldots A_{9R}$ to its output terminals. These address counts are applied to X and Y address decoders 102 and 103, as described previously, to select corresponding write-in and read-out addresses for RAM 101.

The operation of the memory control circuitry shown in FIGS. 4A and 4B is described in detail in the aforementioned application Ser. No. 766,746, filed Feb. 8, 1977. However, the following brief description may facilitate an understanding of the apparatus described below in accordance with the present invention. Both during a signal recording and a signal reproducing operation, write clock signals WC and read clock signals RC are applied to counters 109 and 110, respectively, for generating the write-in address count and read-out address count, respectively. Since these clock signals are of different frequencies, the respective counters are incremented at correspondingly different rates. That is, during recording, the read-out address counter is incremented at a faster rate than the write-in address counter. Conversely, during reproducing, the write-in address counter is incremented at a faster rate than the read-out address counter.

Depending upon the conditions of write gate pulse WG and read gate pulse RG, gates 114 and 116, respectively, are selectively conditioned to supply write clock signal WC and read clock signal RC to gate signal generator 112 so that the respective control signals ADSLCT and $\overline{\text{ADSLCT}}$ and $\overline{\text{WE}}$ are produced. In the absence of these control signals, address selector 111, write-in gates 104 and buffer register 107 effectively are inhibited.

The serialized data words, which are supplied as $D_{IN}$, are synchronized with write clock signals WC in buffer register 106 so as to form resynchronized data words $BR_i$. The first pulse included in a data word is gated by write-in gates 104, which are conditioned by control signal $\overline{\text{WE}}$, into the particular addressed location of RAM 101, which then is selected by address selector 111. Similarly, the next pulse included in the data word $BR_i$ is gated into the next address location of RAM 101, which is selected by address selector 111, and so on until the entire data word has been stored. As mentioned previously, if successive data words are spaced from each other by, for example, an interval substantially equal to two pulses, then this spacing also may be written into RAM 101 as respective binary 0's. As an alternative, or if successive data words are not so spaced, then only the 26 information bits of the data word will be written into corresponding address locations in RAM 101.

Subsequently, the data word which had been serially stored in RAM 101 is read out from the respective storage locations therein. As discussed in the aforementioned application Ser. No. 766,746, filed Feb. 8, 1977, when the ADSLCT control signal undergoes a transition from a binary 0 to a binary 1, the pulse stored in the location then being addressed by address selector 111 is read out therefrom into buffer register 107. Thus, as address counter 110 advances, respective data pulses are read out from RAM 101. Consistent with the foregoing examples, if the two binary 0's which separate successive data words are stored in RAM 101, then these binary 0's likewise are read out to buffer register 107. Alternatively, if such binary 0's are not written into RAM 101, then, during read-out, address selector 111 may select predetermined locations in RAM 101 following the reading out of a 26-bit data word so as to read out two binary 0's which can be stored in such predetermined locations. In yet another alternative embodiment, buffer register 107 may include a binary counter adapted to count the repetitive occurrences of the ADSLCT control signal. That is, after 26 such occurrences, buffer register 107 may be controlled such that two binary 0's automatically are injected into the data word $BR_o$, and RAM 101 is inhibited from reading out additional pulses during this 2-bit duration. In any event, the serialized data word read out from RAM 101 into buffer register 107 is resynchronized in reclocking circuit 108 with read clock signals RC so as to form the resynchronized data words $D_{OUT}$.

As clearly described in the aforementioned copending application Ser. No. 766,746, filed Feb. 8, 1977 the write-in and read-out operations are performed independently of each other and substantially simultaneously. For example, a data pulse may be written into a location in RAM 101 followed by the reading out of another pulse, followed by the writing in of a pulse, and so on. Depending upon the relative time of occurrences of the write and read clock signals, two successive data pulses may be written into or read out from RAM 101 before another data pulse is read out or written in, respectively.

Although not shown herein, if desired, gate circuits, similar to gate circuits 114 and 116, may be provided with write gate pulse WG and read gate pulse RG, respectively, to selectively supply the write clock signals WC and read clock signals RC to address counters 109 and 110, respectively.

Memory Condition Detector

In copending application Ser. No. 771,350, it is pointed out that during a recording operation, data words are continuously written into RAM 101 at different addressable locations therein, but that the stored data words are read out from the memory only during that portion of a field interval when useful data is recorded. That is, the read gate signal RG during recording exhibits a rectangular waveform including an enabling portion, during which data words are read out of the memory, and an inhibit portion, during which data words are inhibited from being read out of the memory. This inhibit portion is substantially coincident with the vertical blanking interval of the vertical sync signal $V_D$ which is interleaved between successive fields of data words. However, the write gate signal WG is substantially continuous so that data words can be written into the memory on a substantially continuous basis. That is, the write gate signal WG does not include an inhibit portion.

As discussed in copending application Ser. No. 771,350, the purpose of providing an inhibit portion in the recording read gate signal RG is to prevent data from being read out of the memory during the time that the vertical sync signal is transmitted, thereby avoiding the possibility of distorting or losing useful information during this vertical sync signal duration. Because of time-compression during recording, the "gaps" between successive fields of data words caused by the rectangular waveform of the recording read gate signal RG does not result in a loss of data information.

As mentioned previously, the memory read-out operation is delayed with respect to the memory write-in operation by some predetermined time. This delay enables the read-out operation, which is performed at a faster rate than the write-in operation, to terminate substantially simultaneously with the writing in (and reading out) of the last data word in a field. Therefore, it is expected that the memory storage location from which a pulse signal is read out will not be equal to the memory storage location into which a pulse signal is written until the last pulse of the last data word in a field is processed. At that time, since all of the written in data words will have been read out, the memory effectively is "empty". Of course, the respective storage locations of the memory, such as RAM 101, may be provided with stored pulse signals, but since such pulse signals already had been read out, these storage locations are considered to be empty.

The foregoing "empty" condition is attained when the write-in address generated by write-in address counter 109 (FIG. 4B) is equal to the read-out address generated by read-out address counter 110. It is useful to detect this condition so that the memory circuits can be reset to an initial state (e.g., RAM 101 can be erased, or cleared), START/STOP signal generator 35 (FIG. 3) can be reset and, if desired, converter 37 also can be reset.

It is possible that, during a recording operation, the memory may reach an "empty" condition, that is, the very same storage location is addressed for a write-in and a read-out operation, before the last pulse signal in the last data word in a field of words is written into the memory. Stated otherwise, the memory circuit effectively reaches an "empty" condition when the read-out operation overlaps or overtakes the write-in operation. Here too it is useful to reset the memory and memory control circuitry to avoid the possible reading out of improper data at the next read clock signal.

In the event that, for some reason, the read-out operation does not proceed properly, it is possible that data words will be stored in all of the available storage locations of the memory. This "filled" condition will be represented by identical addresses generated by the write-in and read-out address counters, similar to an "empty" condition. In order to avoid distortion caused by reading out pulse signals once this "filled" condition has been attained, it is desirable to reset the memory and memory control circuitry upon detecting such a "filled" condition.

While the foregoing has described an "empty" and a "filled" condition reached during a recording operation, these conditions of the memory also can be reached during a reproducing operation. Since a write-in operation may be initiated in coincidence with the initiation of a read-out operation during signal reproduction, all of the memory storage locations may be filled because data is being written into the memory at a faster rate than data is being read out. Of course, once all of the data words which are reproduced during a field have been read out of the memory, the memory circuit effectively is "empty". As in a signal recording operation, the "filled" and "empty" condition of the memory is represented by identical addresses generated by the write-in and read-out address counters.

Figure 5:
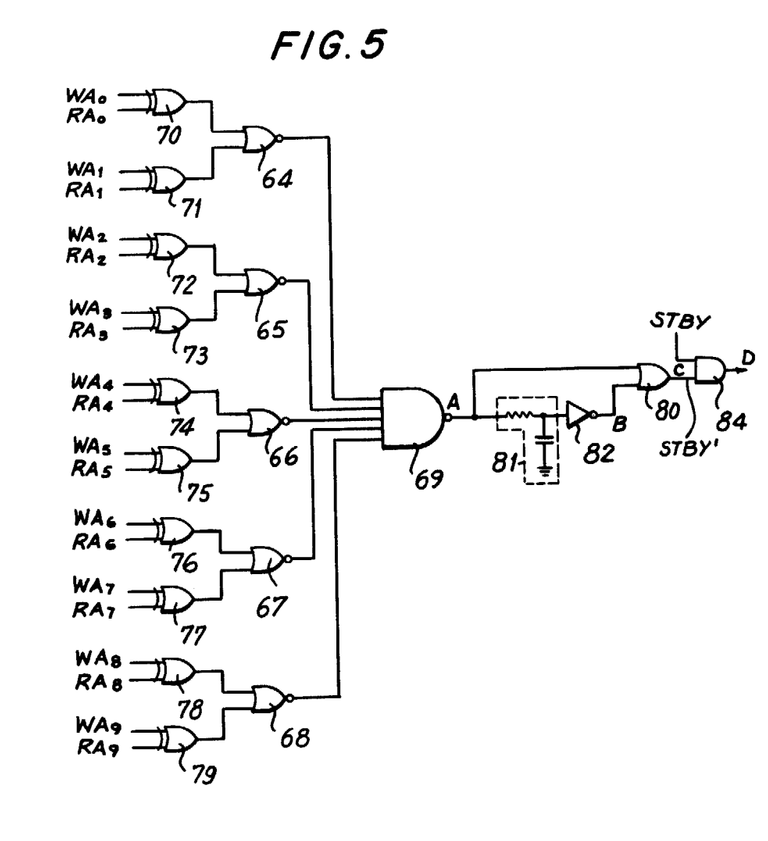
FIG. 5 is a logic diagram of one embodiment of control circuitry in accordance with the present invention.

The logic circuit illustrated in FIG. 5 is adapted to detect the "filled" and "empty" condition of the memory during either a recording or reproducing operation. This detection is achieved by a gating circuit which detects when the address generated by write-in address counter 109 is identical to the address generated by read-out address counter 110 (FIG. 4B). This gating circuit compares each bit of the write-in address to a corresponding bit in the read-out address. In the illustrated embodiment, this comparison is achieved by exclusive-OR circuits 70, 71, . . . 79 to which the respective write-in address bits $WA_0$, $WA_1$, . . . $WA_9$ and the respective read-out address bits $RA_0$, $RA_1$, . . . $RA_9$ are applied. As is known, an exclusive-OR circuit functions to produce a binary 1 when the logical sense of the input signals applied thereto differ, but a binary 0 is produced when the applied input signals are equal. Thus, if all of the exclusive-OR circuits produce binary 0's, then the write-in address $WA_0$, $WA_1$, . . . $WA_9$ is identical, bit-for-bit, to the read-out address $RA_0$, $RA_1$, . . . $RA_9$. The output signals produced by the exclusive-OR circuits are applied to a coincidence detector formed of NOR gates 64, 65, . . . 68 and a NAND gate 69. As shown, NOR gate 64 has a pair of inputs coupled to the output of exclusive-OR circuits 70 and 71, respectively. Similarly, NOR gate 65 has a pair of inputs coupled to the outputs of exclusive-OR circuits 72 and 73, respectively. In a similar fashion, NOR gate 66 is coupled to exclusive-OR circuits 74 and 75; NOR gate 67 is coupled to exclusive-OR circuits 76 and 77; and NOR gate 68 is coupled to exclusive-OR circuits 78 and 79. The outputs of these NOR gates are connected to corresponding inputs of NAND gate 69. Thus, when the write-in address is identical to the read-out address, representing an "empty" or "filled" condition of the memory, NAND gate 69 produces a binary 0.

The output of NAND gate 69 is coupled to a differentiating circuit formed of an OR gate 80 having one input connected directly to the output of NAND gate 69 and another input coupled to the output of the NAND gate via a delay circuit 81 and an inverter 82. The output of OR gate 80 generates a reset signal STBY' which is applied to an AND gate 84 for supplying the STBY reset signal to the memory circuit, memory control circuit, parallel-series-parallel converter, START/STOP signal generator, etc. As shown, AND gate 84 also receives another STBY signal which is generated by mode signal generator 47 (FIG. 3) and described in greater detail in copending application Ser. No. 771,350.

Figure 6A:
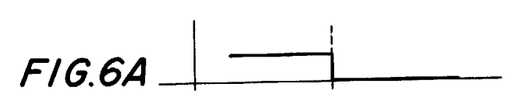
FIGS. 6A–6D are waveform diagrams which are useful in explaining the operation of the control circuit shown in FIG. 5.

In operation, exclusive-OR circuits 70, . . . 79 are supplied with the advancing write-in and read-out addresses. When the memory circuit is "empty" and "filled", these addresses are identical. Hence, each exclusive-OR circuit produces a binary 0. As a result, each NOR gate 64, . . . 68 is supplied with binary 0's at its input terminals, thereby producing a binary 1. Since NAND gate 69 is supplied with a binary 1 at each of its inputs, output signal A produced by the NAND gate undergoes a negative transition from a binary 1 to a binary 0, as shown in FIG. 6A.

Figure 6B:
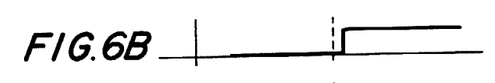
Figure 6C:
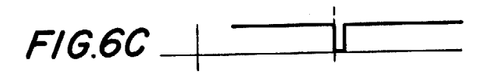
Figure 6D:
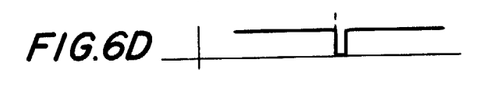

Because of delay circuit 81, the negative transition in signal A is not applied to inverter 82 for a period of time established by the delay circuit. Hence, signal B produced by inverter 82 remains as a binary 0 for this additional delayed period of time, as shown in FIG. 6B. As is apparent from FIGS. 6A and 6B, OR gate 80 is provided with a binary 0 at each of its inputs for the period of time established by delay circuit 81 following the negative transition signal A, thereby producing a negative-going pulse signal C, shown in FIG. 6C. This negative-going pulse is the STBY' signal which appears as signal D at the output of AND gate 84 (FIG. 6D) and which is used to reset the aforementioned circuits to their respective initial conditions. A similar STBY signal is produced by mode signal generator 47 (FIG. 3) whenever switch 46 is closed to initiate a recording operation or when this switch is opened to initiate a reproducing operation, as described in copending application Ser. No. 771,350.

The present invention has been particularly shown and described with reference to a preferred embodiment wherein an "empty" or "filled" condition of an addressable memory device is detected during memory write-in and read-out operations which are being performed at different rates but at substantially the same time. By detecting these conditions, an erroneous read-out or write-in operation can be avoided. It should be readily apparent that various modifications and changes can be made by one of ordinary skill in the art without departing from the spirit and scope of the invention. For example, although the information represented by the stored data words is audio signals, the data words may represent other information, as desired. Therefore, it is intended that the appended claims be interpreted to include such changes and modifications.

What is claimed is:

1. In a system for using a video signal recorder, of the type normally adapted to record and/or reproduce video signals on a record medium, for recording and/or reproducing pulse signals on said record medium, the combination comprising:

a source of said pulse signals;

a memory having addressable storage locations for temporarily storing said pulse signals therein;

write-in means for writing the pulse signals supplied from said source into said addressable storage locations of said memory at a first rate;

read-out means for reading out the pulse signals stored at said addressable storage locations of said memory at a second rate;

said write-in means and said read-out means operating substantially independently of each other and at the same time;

write-in address generating means for generating a plural bit write-in address code corresponding to the memory storage location into which a pulse signal is written;

read-out address generating means for generating a plural bit read-out address code corresponding to the memory storage location from which a pulse signal is read, said write-in and read-out generating means being operative independent of each other; and detecting means for selectively detecting when all of said storage locations are filled with pulse signals or are empty, said detecting means including an address comparator for comparing each bit in said write-in address code to each corresponding bit in said read-out address code to detect when all of said compared bits represent the same storage location, reset means for generating a reset signal when the same storage location is represented by both said write-in address code and said read-out address code, and means for effecting the erasure of the contents of all of said storage locations in response to said reset signal.

2. The combination of claim 1 wherein said address generating means includes a source of write-in clock signals at said first rate, and means for supplying said write-in clock signals to said write-in address generator to advance said write-in address generator to generate successive storage location addresses; and a source of read-out clock signals at said second rate, and means for supplying said read-out clock signals to said read-out address generator to advance said read-out address generator to generate successive storage location addresses.

3. The combination of claim 2 wherein said write-in and read-out address generators each comprises a counter having plural output terminals for generating a plural bit count at said output terminals; and said address comparator comprises gating means for determining when the respective plural bit counts of said counters are equal.

4. The combination of claim 3 wherein said gating means comprises a plurality of exclusive-OR circuits, each coupled to an associated output terminal of both counters for sensing when the respective bits at said associated output terminals are equal; and coincidence means for determining when all of said exclusive-OR circuits sense equal bits at their associated counter output terminals.

5. The combination of claim 2 wherein said reset means comprises a pulse generator coupled to said address comparator for generating a reset pulse when the address codes generated by said write-in and read-out address generators are equal.

6. The combination of claim 1 wherein said video signal recorder is adapted for signal recording, and further comprising means intercoupled between said read-out means and said recorder for supplying said read out pulse signals to said recorder.

7. The combination of claim 1 wherein said video signal recorder is adapted for signal reproduction, and further comprising means intercoupled between said recorder and said write-in means for supplying the pulse signals reproduced by said recorder to said write-in means.

8. In a system for recording audio information in pulse encoded form, the combination comprising:
- analog-to-digital converter means for converting said analog signal input pulse encoded signals, each of said pulse encoded signals being formed as a plural bit signal;
- a memory having plural, addressable storage locations therein, each addressable storage location being operative to store a respective bit of a pulse encoded signal;
- a source of write-in clock signals having a first repetition frequency;
- write-in means responsive to said write-in clock signals for writing each of the bits of successive ones of said pulse encoded signals into said addressable storage locations of said memory at a first rate determined by said write-in clock signals;
- a source of read-out clock signals having a second repetition frequency higher than said first repetition frequency;
- read-out means responsive to said read-out clock signals and actuated at a predetermined delayed time with respect to said write-in means for reading out each of the bits of successive ones of said pulse encoded signals stored in said addressable storage locations of said memory at a second rate determined by said read-out clock signals; said write-in means and said read-out means operating substantially independently of each other and contemporaneously;
- a write-in address counter responsive to said write-in clock signals for generating plural bit write-in address codes representing respective bit storage locations in said memory into which the bits of said pulse encoded signals are written;
- a read-out address counter responsive to said read-out clock signals for generating plural bit read-out address codes representing respective bit storage locations in said memory from which the bits of said pulse encoded signals are read;
- detecting means coupled to said write-in address counter and to said read-out address counter for detecting when a plural bit write-in address code is equal to a plural bit read-out address code, thereby indicating that all of said memory storage locations are filled or empty; and
- reset means responsive to said detecting means for resetting all of said storage locations, said write-in address counter and said read-out address counter to their respective initial conditions when said write-in and read-out address codes are equal.

9. In a system for reproducing analog audio information from pulse encoded form, the combination comprising:
- digital-to-analog converter means for converting a plural bit pulse encoded signal to an analog audio signal;
- a memory having plural, addressable storage locations therein, each addressable storage location being operative to store a respective bit of a pulse encoded signal;
- a source of write-in clock signals having a first repetition frequency;
- write-in means responsive to said write-in clock signals for writing each of the bits of successive ones of pulse encoded signals into said addressable storage locations of said memory at a first rate determined by said write-in clock signals;
- a source of read-out clock signals having a second repetition frequency lower than said first repetition frequency;
- read-out means responsive to said read-out clock signals for reading out each of the bits of successive ones of said pulse encoded signals stored in said addressable storage locations of said memory at a second slower rate determined by said read-out clock signals to be supplied to said digital-to-analog converter means; said write-in means and said read-out means operating substantially independently of each other and contemporaneously;
- a write-in address counter responsive to said write-in clock signals for generating plural bit write-in address codes representing respective bit storage locations in said memory into which the bits of said pulse encoded signals are written;
- a read-out address counter responsive to said read-out clock signals for generating plural bit read-out address codes representing respective bit storage locations in said memory from which the bits of said pulse encoded signals are read;
- detecting means coupled to aid write-in address counter and to said read-out address counter for detecting when a plural bit write-in address code is equal to a plural bit read-out address code, thereby indicating that all of said memory storage locations are filled or empty; and
- reset means responsive to said detecting means for resetting all of said storage locations, said write-in address counter and said read-out address counter to their respective initial conditions when said write-in and read-out address codes are equal.

* * * * *